United States Patent [19]

Alley

[11] 4,435,700

[45] Mar. 6, 1984

[54] EVENT DETECTION AND INDICATION SYSTEM

[76] Inventor: Patrick H. Alley, Squirrel Leap, Hagley Rd., Fleet, Hampshire, GU13 8LH, England

[21] Appl. No.: 415,594

[22] Filed: Sep. 7, 1982

Related U.S. Application Data

[63] Continuation of Ser. No. 197,773, filed as PCT/GB79/00204, Nov. 30, 1979, published as WO80/01214, Jun. 12, 1980, § 102(e) date Jul. 29, 1980, abandoned.

[51] Int. Cl.³ .......................... G08B 1/08; H04Q 7/00

[52] U.S. Cl. .................................... 340/539; 340/506; 340/508; 340/512; 340/537; 340/825.05; 340/825.06

[58] Field of Search ............... 340/539, 537, 500, 506, 340/508, 511, 512, 513, 531, 825.05, 825.06, 825.1-825.13, 509, 510

[56] References Cited

U.S. PATENT DOCUMENTS

| | | | |
|---|---|---|---|
| 3,644,927 | 2/1972 | Green | 340/537 |
| 3,686,531 | 8/1972 | Decker et al. | 340/537 |
| 3,702,474 | 11/1972 | Fink et al. | 340/537 |
| 3,821,733 | 6/1974 | Reiss et al. | 340/537 |
| 3,924,256 | 12/1975 | Cohen | 340/508 |
| 4,118,700 | 10/1978 | Lenihan | 340/537 |

FOREIGN PATENT DOCUMENTS

| | | | |
|---|---|---|---|
| 1766735 | 8/1971 | Fed. Rep. of Germany | 340/537 |

*Primary Examiner*—Donnie Lee Crosland
*Attorney, Agent, or Firm*—Barnes & Thornburg

[57] ABSTRACT

The detection of events such as illegal entry detection, or the occurrence of predetermined hazards are detectable by a system including a circuit loop 2 which incorporates event actuatable switches 1, 35, 37, 38. Each switch has associated therewith means **(9, 36, 37*a*, 39) for both maintaining electrical continuity in the loop, following operation of the associated switch and for producing an electrical condition in the loop which is indicative of switch operation. A control circuit 7** is arranged to respond according to the condition produced and produce an alarm characteristic of the condition.

15 Claims, 13 Drawing Figures

EVENT DETECTION AND INDICATION SYSTEM

This is a continuation of application Ser. No. 06/197,773 filed as PCT/GB79/00204, Nov. 30, 1979, published as WO80/01214, Jun. 12, 1980, § 102(e) date Jul. 29, 1980 now abandoned, which application was originally filed under the provisions of the Patent Cooperation Treaty as International Application No. PCT/GB79/00204 having international filing date Nov. 30, 1979.

This invention relates to event detection and indication apparatus. In particular the present invention is concerned with a system for providing an indication of the occurance of events such as the actuation of an intruder actuated switch in a burglar alarm system, the actuation of a switch associated with a sensor responsive to a predetermined situation such as a hazard condition i.e. fumes, smoke, fire.

Particularly, in relation to burglar alarms and other hazard detection systems it is known to provide arrangements whereby the opening of a switch causes an associated control system to produce an alarm indication to the effect that a switch has been operated.

According to an aspect of the invention there is provided an event detection and indication system including a circuit loop incorporating at least one event responsive actuatable switch, characterised in that each switch has associated therewith means for both maintaining electrical continuity of the loop following operation of an associated switch and for producing an electrical condition in the loop which is indicative of switch operation.

Reference will now be made to the accompanying drawings in which

Figure 5:
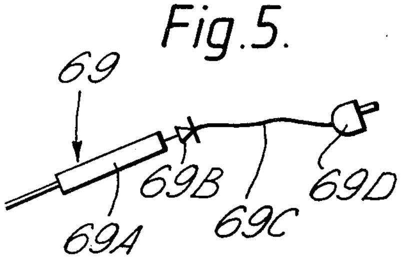

FIG. 5 schematically illustrates a circuit condition checking probe arrangement.

Figure 6:
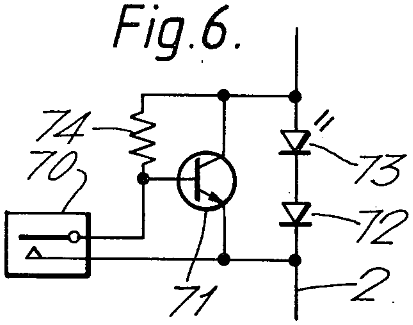

FIG. 6 is a circuit diagram of a first mode of connecting a switch unit into the system of the invention.

Figure 7:
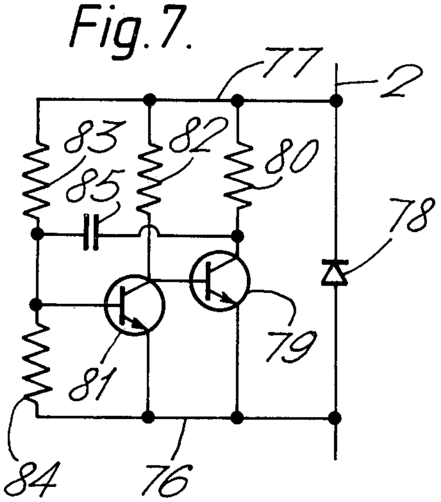

FIG. 7 is a circuit diagram of an arrangement for introducing a radio frequency signal into the system.

Figure 8:
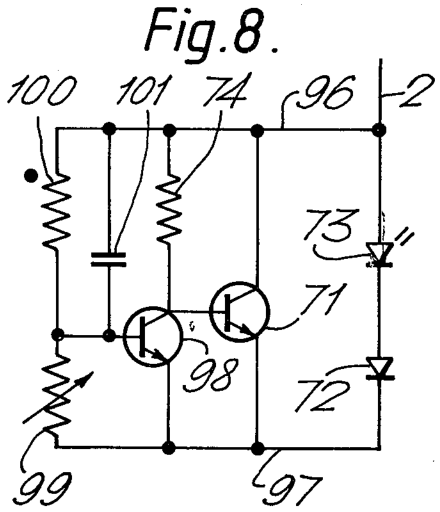

FIG. 8 is a circuit diagram illustrating the incorporation of a trigger circuit into the system to facilitate the use of sensors with a slow response to the associated control parameter.

Figure 9:
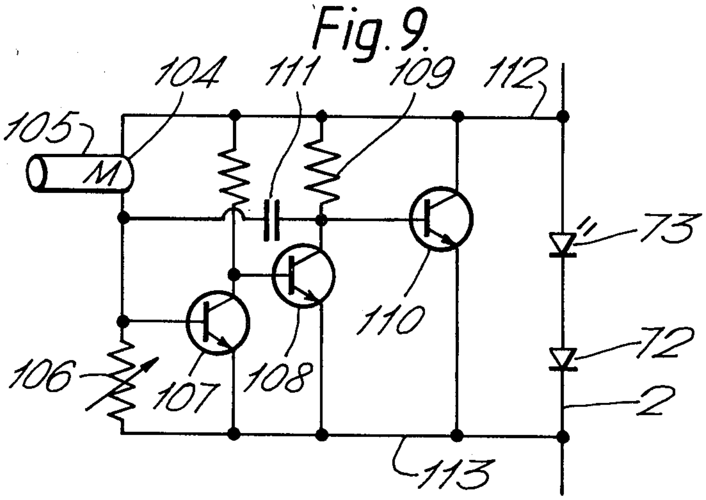

FIG. 9 is a circuit diagram illustrating the mode utilising a sensor arrangement using a photocell.

Figure 10:
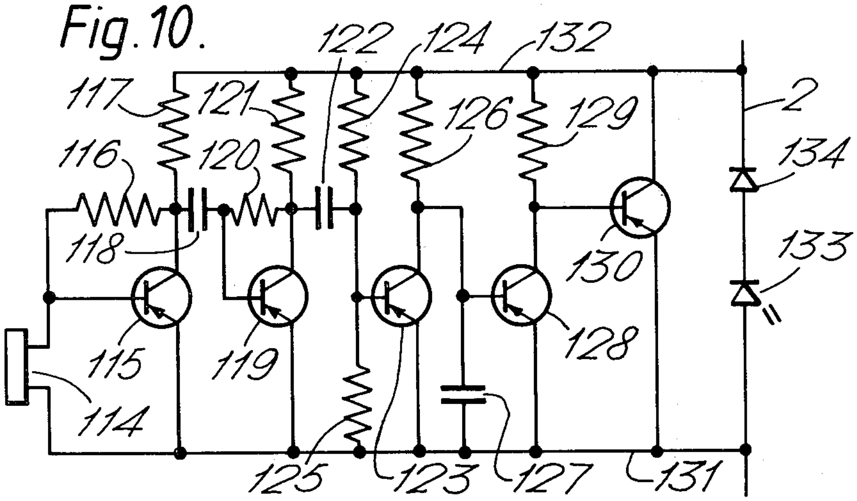

FIG. 10 is a circit diagram of an ultrasonic detection arrangement for use with the system of the invention.

Figure 11:
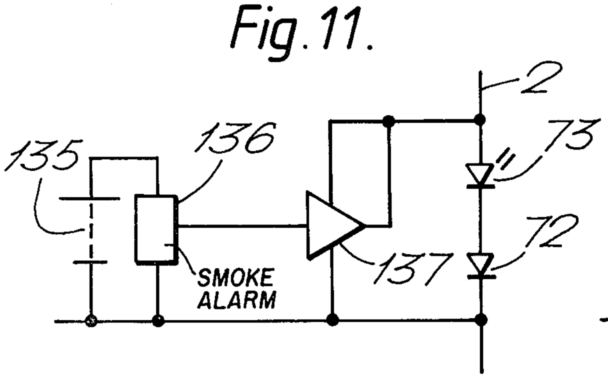

FIG. 11 is a circuit diagram illustrating a mode of connecting into the system a switch unit incorporating an auxiliary powered control unit.

Figure 12:
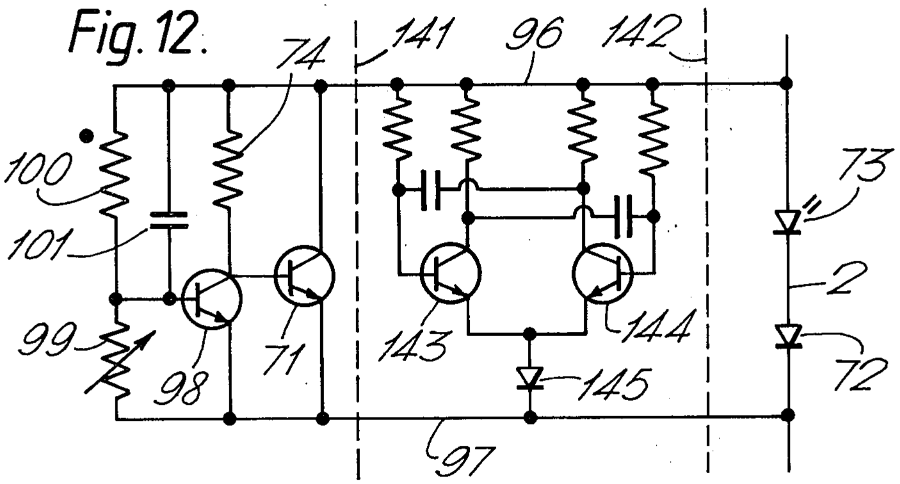

FIG. 12 is a modified form of the circuit shown in FIG. 8, and

Figure 13:
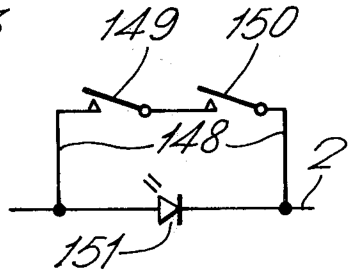

FIG. 13 is a circuit diagram which illustrates a method of extending the system of the invention to incorporate auxiliary buildings.

Figure 1:
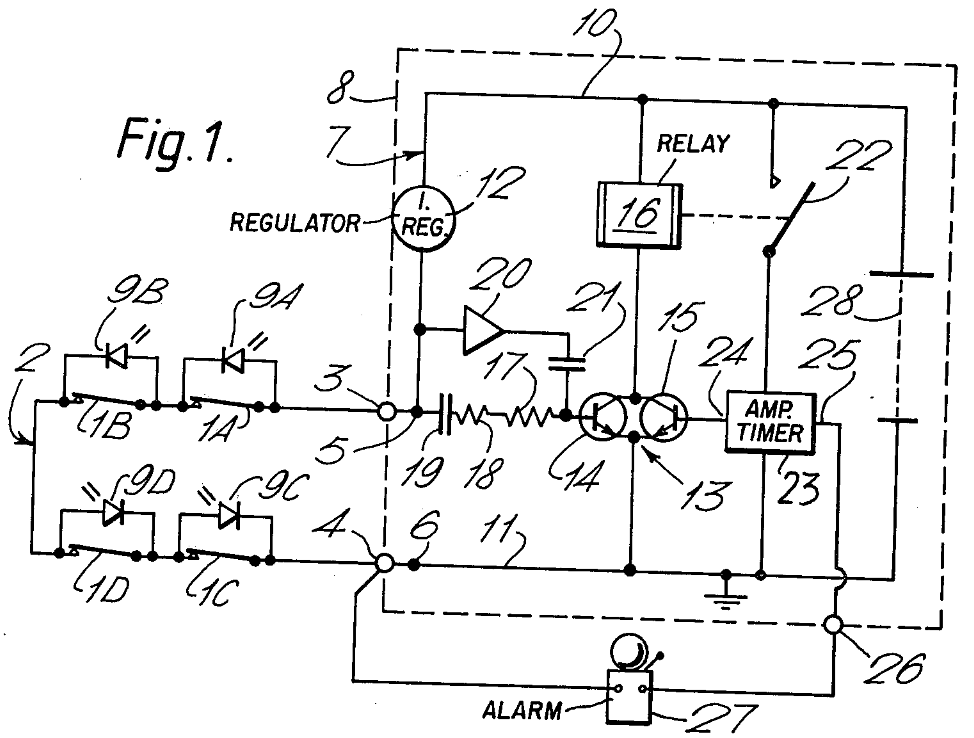
FIG. 1 is a circuit diagram illustrating features of the system of the invention.

Referring now to the drawings and more particularly to FIG. 1, a plurality of normally closed switches 1A, 1B, 1C, 1D, . . . are serially connected to provide a loop circuit 2 whose ends 3 and 4 are respectively connected to terminals at circuit points 5 and 6 of a control circuit 7 shown within a dashed rectangle 8.

A passive or dynamic circuit element 9A, 9B, 9C . . . such as a resistance, impedance, unidirectional conductive device or other means for producing a voltage pulse on initiation into operation, is connected in parallel with the switches 1A, 1B, 1C, . . . . In the figure the elements 9A 9B are depicted as light emitting diodes (LED's).

The control circuit as shown in FIG. 1 includes an upper or positive voltage rail 10, and a lower or negative voltage rail 11 which is an earth rail. The circuit point 5 connects to the upper rail 10 by way of a constant current source 12, capable of providing a current level of typically 5 to 10 milliamps.

The circuit point 6 connects with the earth rail 11.

An amplifier unit 13 is connected across the voltage rails 10, 11, and a pair of transistor 14, 15 whose collectors connect with the upper rail through a relay 16, and whose emitters are connected with the earth rail 11.

The base of the transistor 14 is connected via serially connected resistors 17, 18 and a capacitor 19 to the circuit point 5. A dc voltage level detector 20 serially connected with a capacitor 21 is connected between the circuit point 5 and the base of transistor 14.

The relay 16 has a normally open contact set 22 connected between the voltage rails 10 and 11, there-being a combined circuit timer/amplifier unit 23 connected in series with the contact 22.

This unit 23 has an output 24 connected with the base of the transistor 15 and a second output 25 which connects with an output terminal 26 of the control circuit 7.

An alarm device or unit 27, which can provide an audible and/or visual indication or alarm and which is shown as a bell, is connected across the terminals 4 and 26. This control circuit 7 is energised by a battery 28 with the polarities as shown.

The above discussed circuit has a quiescent state in which with the battery supply connected into circuit as shown, the relay 16 is de-energised so that the timer/amplifier unit 23 is switched-off.

The constant current source 12 maintains the current conditions within the requirements for the voltage levels of the circuit 7.

It will be understood that the amplifier unit 13 can be conveniently regarded as a voltage sensing and amplifier circuit which is responsive to positive excursions of the voltage within the switching loop 2.

The circuit values of the components of the unit 13 are chosen such that the unit 13 responds to a positive excursion of typically 1.5 volts or more sufficient to activate the timer unit 23. The detector unit 20 is arranged to transmit a positive voltage to operate the unit 13 if the dc level at point 5 exceeds a threshold level conveniently set at 2.5 volts less than the upper rail voltage level, Assuming that all of the switches 1A, 1B, . . . are initially closed, the above described circuit operates as follows: On opening one of the switches i.e. the switch 1C the associated LED 9C is effectively connected into circuit and on so doing produces a voltage pulse in the loop 2 which corresponds to the forward voltage of the LED 9C and which is at a level of typically 1.5 volts. This voltage pulse is developed at the circuit point 5 and is also detected by the voltage detector 20 in such manner that if the voltage at the point 5 exceeds the predetermined threshold voltage level i.e. 2.5 volts less than positive rail voltage a positive voltage equal to that of the positive voltage supply is transmitted via capacitor 21 to the base of transistor 14.

On receipt of this voltage pulse the amplifier unit 13 produces an output which actuates the relay 16 whereby contacts 22 close and allows voltage to be applied to the timer and amplifier unit 23, whose timing cycle can be selectively adjusted.

Energisation of the unit 23 has three principal results, firstly an output voltage is produced at output 24 which switches transistor 15 on thereby to complete a 'hold' circuit for the relay 16; secondly operation of the selected timing cycle of the unit 23 is started; and thirdly a second output voltage is produced which activates the alarm device 27. Summarising it will be seen that operation of any one of the loop switches 1A, 1B, 1C,—automatically causes operation of the alarm device 27.

If the opened switch 1C should now be closed the closing operation will produce a negative going pulse which is effectively rejected by the above described circuit so that closure of a switch does not affect the operation of the control circuit. Hence, closure of a switch—after initiation of an alarm cycle—will not avert initiation of the alarm, which once started must continue for the preset time period.

At the end of the time period set into the timer unit 23, the latter switches off, and thus breaks the relay hold condition so that the relay switches off allowing contacts 22 to open. The control circuit then returns to its quiescent state. This occurs even though the opened switch 1C remains open thereby permitting energisation of the LED 9C whereby the latter continues to provide a visual indication that the switch 1C is open.

If now a second switch, i.e. the switch 1A, is opened the opening thereof will lead to the production of a positive pulse as a result of the energisation of the associated LED 9A; thereby initiating the above described sequence of events within the control circuit 7 thereby to reactivate the alarm device 27 for the time period set into the timer unit 23. At the end of this further timing period the control circuit 7 returns to the quiescent state, even though two loop switches i.e. 1C and 1A remain open and two LED's, 9C and 9A are thus illuminated.

In other words, the opening of one or more switches in the loop does not immobilise or mute the system from operation if a further switch is opened.

In practice, the number of loop switches which can be functionally accommodated will be related to the total number of switches/LED combinations in the loop and the voltage levels of the system.

It will be noted that the loop 2 is connected to the control circuit 7 through an ac coupling only i.e. via capacitors 19 and 21, so that a steady voltage condition will not produce the requisite positive voltage pulse excursion necessary to trigger the circuit.

Thus, when the above discussed system is used as a security system i.e. burglar alarm system, in which the switches 1A, 1B, 1C,—serve as intruder actuated switches and take the form of e.g. door operated switches, window operated switches, the system, whilst responding to the opening of any one of the protected doors or windows, is not immobilised following the opening of any particular switch, so that even after switch operation the system remains capable of detecting intruder actuation of any of the switches still closed in the loop.

In a security system it is clearly desirable for legal users of a protected building to be able to open doors or windows without setting off the alarm system.

Figure 2:
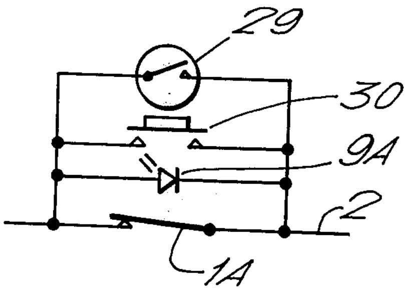
FIG. 2 is a circuit diagram of a first embodiment of a circuit switch over-ride arrangement.
Figure 3:
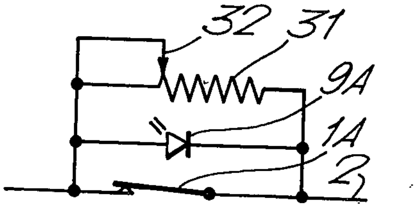
FIG. 3 is a circuit diagram of a second embodiment of a circuit over-ride arrangement.

In the system according to the invention this facility is provided. Reference will now be made to FIGS. 2 and 3 which demonstrate the introduction of a silent opening facility to a door switch and a window switch.

Thus, FIG. 2 illustrates an over-ride facility for a door switch and includes two additional switches 29, 30 connected in parallel with the intruder actuated switch (i.e. switch 1A) in the loop 2. The switch 29 is a key operated switch and the switch 30 is a push button switch.

In practice the switch 29 would be on the entry side of the door and the switch 30 on the opposite side of the door. To open the door silently (that is without activating the alarm bell 27) the key switch is operated, this completes a second current path across the loop switch 1A, so that when the door is opened, thereby opening the switch 1A, circuit continuity is maintained so that the LED 9A is not energised. After opening the door the push button switch 30 is depressed, once again to complete a still further electric circuit in parallel with the switch 1A, and the key switch is opened i.e. the key removed (at this point the switch 1A will still be open). The door is then closed, thereby closing the switch 1A, and the push button switch released. It will be noted that at all times during the door opening sequence a current bypass is provided in parallel with the LED 9A so that the latter cannot be energised and thus trigger the control circuit.

To open the door from the inside a reverse procedure is used i.e. actuate the switch 30, open the door, pass through the open door and whilst maintaining the switch 30 actuated operate the key switch, and close the door. The key is then removed from the key switch.

The circuit shown in FIG. 3 demonstrates a silent opening facility for a protected window.

The circuit of FIG. 3 relies on the fact that the input current to the base of transistor 14 has an inherent time constant because of the series combination of capacitor 19 and resistors 17, 18. This condition implies that rapid switch operation is important if excessive attenuation of the trigger voltage is to be avoided. This is necessary to ensure that the switch opening positive pulse is adequate to effect the desired triggering of the remainder of the control circuit.

As a means of preventing triggering of the control circuit it is proposed to over attenuate the positive pulse produced in the loop circuit on the opening of a protected window by introducing into the loop circuit a high resistance value which greatly increases the above mentioned time constant. Thus, in FIG. 3 to achieve silient window opening an adjustable resistor 31 is connected in parallel with the loop circuit switch e.g. switch 1D.

This resistance is of the kind which has a control 32 loaded by a spring 33 which acts so as to maintain the resistance in circuit at a maximum value; and which control has to be turned against the spring loading to obtain a minimum value (i.e. zero) resistance value.

To open the window silently the resistance value of resistor 31 is set to zero, and the window opened. The resistance control 32 is released on window opening. The release of the control allows the resistance level to return to the initial setting in which the resistance value in the circuit is at a maximum. However, the rate of change of the resistance value introduced into the circuit loop is not sufficient to prevent attenuation of the positive pulse arising from the opening of the window loop switch 1D, to such an extent as to prevent operation of the control circuit.

In practice, the window can be closed at any time without initiation of the alarm since, as mentioned above, the negative going pulse arising from closure of a loop switch does not affect the operational condition of the control circuit.

The above discussed system is not susceptible to the introduction of a circuit over-ride or 'cheat' resistance into the loop as a means of bypassing the effect of opening one or more of the loop switches. Such a 'cheat' resistance can be regarded as a variable resistance which is introduced into the loop at minimum value, i.e. zero, and is gradually increased in value.

The voltage excursion produced is attenuated by the capacitor 19 sufficiently to ensure that the cheat resistance itself exhausts most of the loop voltage.

As a result the voltage detector will sample the d.c. voltage of the point 5 and if it exceeds the power supply volage less 2.5 volts the output of the voltage detector will switch from zero volts to the full power supply voltage, this voltage excursion triggering the alarm by way of the capacitor 21 and the amplifier 14 thereby initiating operation of the timed alarm system. Should the 'cheat' resistance be increased sufficiently such that the product of the 'cheat' resistance and loop current is greater than or equal to V+ less 2.5 volts, the voltage detector will trigger.

If on the other hand, the magnitude of the cheat resistance is relatively low the control circuit will operate normally, thus there is no value of 'cheat' resistance which can cheat the systems.

As so far described the loop switches have been shown as simple mechanically operated intruder actuated switches.

In practice, the loop can be provided with various forms of non-intruder actuated switches such as electronic switches which are responsive to the outputs of sensors which in turn are responsive to predetermined external conditons or situations such as hazard conditions, information transfer from a remote position to the control circuit. Such sensors can be responsive to a wide variety of hazards, such as, overheating; fire; smoke or other fumes; the presence of foreign bodies within pre-determined regions relative to a sensor, sounds etc., Also the loop can be provided with 'panic' or personal attack alarm actuating switches. In addition, it is also convenient to be able to check the operational setting of the loop switches from the control unit.

The sensor devices for the purposes of this Application can be conveniently regarded as comprising two main forms, those which are energised principally from supply sources external to the loop, and those which are energised exclusively from the currents following through the loop.

Figure 4:
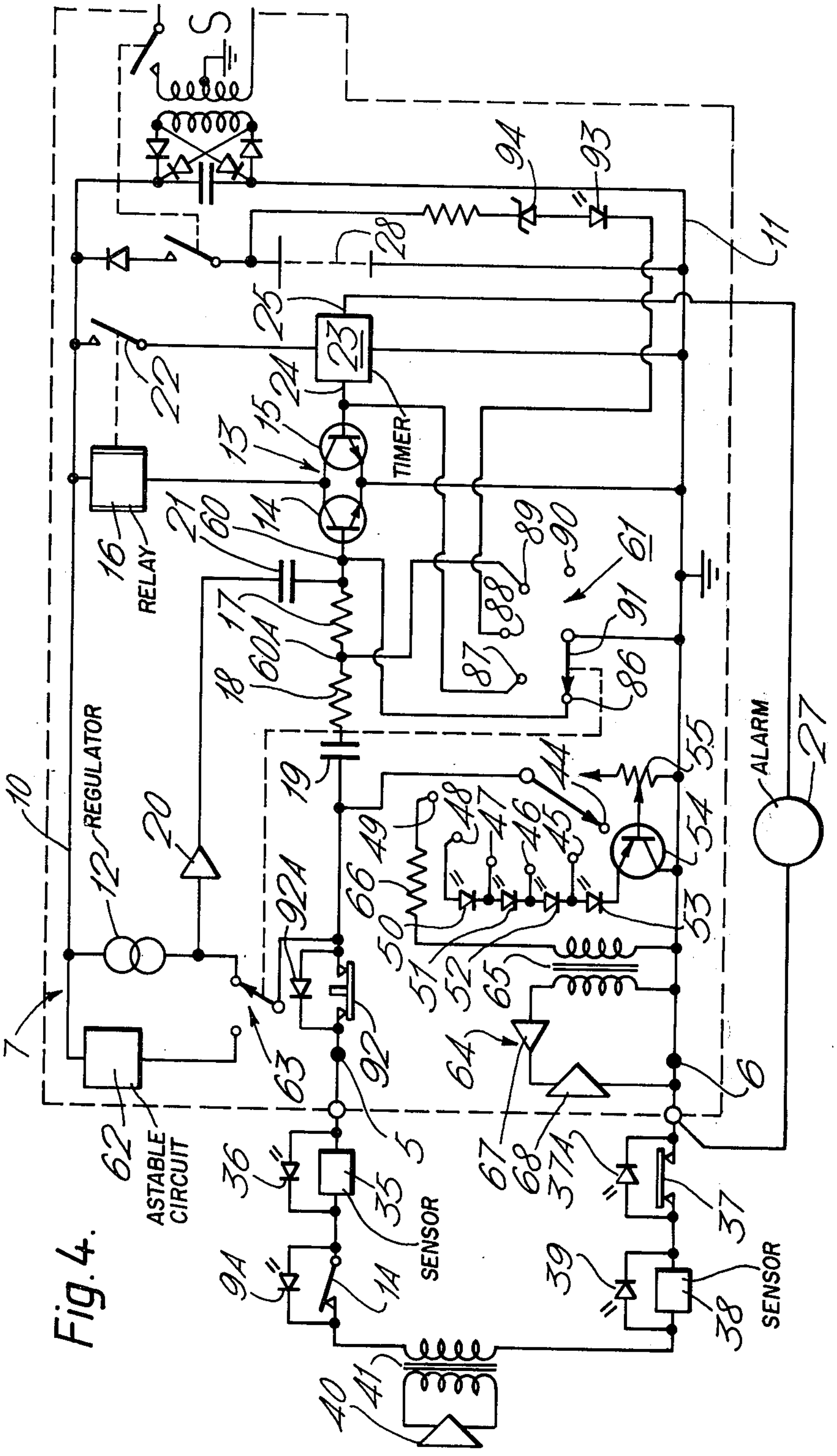
FIG. 4 is a circuit diagram illustrating in a more detailed form the system of the invention.

FIG. 4 illustrates a loop 2 which is provided with sensors and associated electronic switches, and a more complex control circuit 7 which is able to accommodate the introduction of the sensor actuated switches into the loop and which includes a loop switch condition check facility, and a general monitoring facility.

For convenience in the loop of FIG. 4 those sensors which are indicative of external conditions and which are loop or external battery energised are generally indicated by a block 35 having an associated LED 36.

The panic or personal attack switch arrangements are represented by a normally closed push button switch 37. Such switches may have an associated serially connected impedance 37*a* such as a LED connected in parallel therewith.

Those sensors which incorporate some form of audio signal or tone generator facility are conveniently shown as a block 38 having an associated LED 39 or diode 78 (FIG. 7)

It will be appreciated that by suitable selection of the alarm indications provided by the system on operation of the intruder actuated switches; the hazard responsive sensors; and other switches such as the personal attack switches, the nature of the alarm indication given would immediately indicate the reason for the alarm signal being given. Thus, actuation of an intruder switch could be represented by the indication provided by the alarm 27 only; indication of the actuation of a hazard responsive sensor could be effected by operation of the alarm 27 accompanied by emission of a load distinctive tone from the speaker 68; and indication of a non-hazardous situation could be provided by the emission of a distinctive tone only from the loud speaker.

If it is desired that the loop should be capable of being used for information communication purposes, i.e. capable of transmitting or receiving audio signals, transformer coupled microphone/receivers or the like can be included in the loop. This facility is represented by a loudspeaker 40 and associated transformer 41.

The above mentioned facilities and sensor arrangements will be briefly considered hereinafter.

The switch checking facility includes a multiposition switch 42 having a selector arm 43 and switched contacts 44, 45, 46 47, 48 and 49. The arm 43 is connected to the circuit point 5.

Of the switched contacts the contact 44 is used as a switch OFF contact. The contacts 45 to 48 are used for the loop condition checking facility and the contact 49 may be regarded as a spare; whose use will be considered hereinafter.

A cascade of serially connected LED's 50, 51, 52 and 53 is connected to the emitter of a transistor 54 whose collector is connected to the earth rail 11, and whose base is connected via a potentiometer 55 to the upper rail 10.

The switch contact 45 is connected via the LED 53 to the transistor 54; the contact 46 is connected through LED's 53 and 52 to the transistor 54; the contact 47 is connected through the LED's 51, 53 and 52 to the transistor LED's 50–53 to the transistor 54.

The mode of operation of the loop condition check facility will now be considered. For convenience of explanation it will be assumed that the LED 53 is connected directly to the lower rail 11 (i.e. transistor 54 is considered not to be included in the circuit), and that all of the loop switches are closed.

Under these conditions there is for the purposes of the present discussion essentially no potential difference between the circuit points 5 and 6.

Since it is not desired to sound the alarm during the operating of the check facility the junction 60 of resistor 17 and transistor 14 is connected by a switch 61 to the earth line, thereby to inhibit operation of amplifier unit 13. The switch 61, as shown has a plurality of switching positions which will be considered hereinafter.

Returning now to the check facility; if the switch arm 43 is set to the contact 45 the circuit points 5 and 6 are connected by way of the switch 42 and the LED 53 to earth. Thus, the LED 53 will be in its extinguished condition.

If now a loop switch is opened a positive voltage will be produced in the loop at the circuit point 5 and will thus be applied by way of the switch 42 to the LED 53 which will operate and illuminate. Also the actuated loop switch LED will be illuminated from current supplied by the current source 12.

Rotating the switch arm 43 to co-operate with the contact 46 will cause LED 53 to extinguish, since the voltage hitherto applied there is now applied to the serial pair of LED's 53 and 52. This voltage is not sufficient to illuminate both LED's 52 and 53.

If now a second loop switch is opened the additional new voltage level arising from this condition will be able to maintain both LED's 52 and 53 in the illuminating condition.

In other words the number of loop switches open determines the number of the LED's 50 to 53 which can be maintained in an illuminated condition. In practice, this means that by scanning the switch arm 43 around the contacts 45 to 48 a visual indication is provided of the number of loop switches that are open; thereby informing the operator whether or not it is necessary to check the system to ascertain whether or not any doors or windows are open.

Should all four LED's 50–53 in the control box illuminate when selected, yet no loop LED's are found to be illuminated this is indicative of an open circuit in the loop. Since the loop may be quite extensive 'trouble-shooting' a break, particularly where the wire is inaccessible, could be very time consuming employing conventional methods necessitating the use of long lengths of wire to bridge adjacent switches and special instruments unlikely to be in the possession of the domestic user. Instead a quick and simple method is catered for by a probe arrangement shown in FIG. 5.

This probe 69 can include a test prod 69A having an integral LED 69B in series therewith and which connects by way of a lead 69C with a polarised mains plug 69D which is such that when inserted in any convenient mains socket connects the test prod by way of the LED to mains earth.

The prod 69A is now placed in electrical connection witch a switch located as near as possible to the mid-point of the loop. If the prod LED 69B illuminates the open circuit condition will be located between the switch being tested and the lower circuit point 6. (note point 6 is always at earth potential). The prod 69A is then engaged with a switch at the mid-point of this part of the loop, once again plugging the probe plug 69D into the nearest convenient mains socket, the switch being positioned adjacent the loop part mid-point. If the probe LED 69B illuminates the process is repeated. If the LED 69B does not illuminate this indicates that the fault is located between the last two switches to be tested.

It will be appreciated that the above discussion has presumed the absence of the transistor 54. In the actual circuit it will be apparent that there is always a residual potential difference between the circuit points 5 and 6. The transistor 54 is biased to counteract the effects of this potential difference.

It has been found that a flashing LED is easier to see than a LED with steady illumination. To enable the loop circuit LED's to flash an astable circuit 62 is provided and is switchable into circuit by a switch 63.

The switch 63 serves to connect either the source 12 or the astable circuit 62 to the circuit point 5.

The switch 63 is ganged with the switch 62 so that when the control circuit operation is inhibited by the switch 61 the astable circuit 63 is connected into circuit so that the flashing LED facility is automatically switched in for monitoring purposes.

As has been mentioned a communication facility can be provided in the loop 2, and this implies complementary facilities in the control circuit 7 for coupling with those in the loop. In the arrangement of FIG. 4 the loop is closed by electrically connecting the circuit points 5 and 6. This is effected by using the spare contact 49 of the switch 42 to provide a connection to the lower voltage rail 11 by way of a transmitter/receiver unit 64 which includes a transformer 65 and series resistor 66 connected between contact 49 and the lower voltage rail 11, the transformer connects through an amplifier 67 to a microphone/loudspeaker facility 68.

Bearing in mind that certain of the sensors in the loop 2, i.e. sensors 38, are capable of producing audio frequency tones and that each sensor can be tuned to produce a characteristic tone, it follows that the transmitter/receiver facility at the control unit can be readily arranged to reproduce these tones at the loudspeaker 68.

Also, in view of the transmitter/receiver facility 64 the system can clearly be utilised to transmit signals to the loop for operating devices responsive thereto and for the relay of messages etc., from the control unit 7 to the loop 2.

It will be noted that the above mentioned communication loop is maintained even if any one of the sensors 38, 35 is activated or any switch represented by 1A, 37 is open since the constant current source 12 is continuously feeding current to the loop, whereby any LED, transistor diode etc., which is electrically exposed in the loop is effectively biased into its linear region of operation and this simulates with respect to the loop a low resistance to low level ac voltage.

Embodiments of particular sensors suitable for the loop will now be considered. Thus FIGS., 6 and 7 respectively show examples of basic forms of sensors represented by the block 35.

In FIG. 6 the sensor is a pressure pad switch 70. The switch 70 is normally open and is connected across the base-emitter circuit of a transistor 71 whose emitter-collector circuit is connected across serially connected diode 72 and LED 73 which latter corresponds to the LED 36 in FIG. 4. A resistor 74 is in the base-emitter circuit of the transistor.

This circuit operates as follows:

The series connected diode 72 and LED 73 effectively act as a voltage supply equivalent to the combined forward voltage of the diode 72 and LED 73, i.e. 1.5+0.8 volts. This voltage provides most of the loop current to the circuit consisting of transistor 70, base-collector resistor 67 and the open contacts 69 of a pressure mat 68. The full base current provided by resistor 67 is amplified such that the typical loop current available, say 7 ma, pulls down the collector-emitter voltage to 0.3 v for a germanium (Ge) transistor (0.7 v for a silicon (Si) transistor). Thus the effective resistance shunted across the LED and diode is approximately 300 mV/7 ma=4.5 Ohms and the LED is extinguished. If the pressure mat is stepped on so as to close the contacts 69 the collector-emitter resistance goes high (typically 20–40K) diverting all the loop current back through LED 71 and 72 which zener at 2.3 v, causing a (2.3–0.3-)volt=2 volts positive excursion trigger voltage, resulting in a timed alarm. The rate of voltage excursion is dictated principally by the switching time of the pressure mat contacts 69 so the signal attenuation through capacitor 11 is negligible. Note that PNP transistors can be substituted for NPN transistors and vice-versa so long as conventional polarity connections are observed. This will be the case for all future circuits described.

That part of the above discussed circuit comprising the LED 73, the diode 72, and the transistor amplifier 71 can conveniently be regarded as sensor circuit connection module since the above discussed mode of producing a loop triggering voltage pulse can be utilised with a variety of different sensors. This is because the module can be regarded as providing a means, which (whilst in its quiescent state) is able to restrict or divert loop current to an extent which prevents operation of the associated loop LED and which (in its activated state) is able to divert the loop current back through the associated loop LED to produce the positive triggering pulse in the loop.

FIG. 7 is a diagram of a circuit which produces an audio or radio frequency output in the loop and can be regarded as being a particular form of the block 38 of FIG. 4.

The circuit of FIG. 7 includes upper voltage rail 77 and a lower voltage rail 76 which are connected in parallel with a diode 78 included in the loop 2.

The collector of a transistor 79 connects through a resistor 80 to the voltage rail 77, the emitter thereof being connected to the voltage rail 76.

Likewise the collector of a transistor 81 connects through a resistor 82 to the voltage rail 77, whilst the emitter thereof is connected to the voltage rail 76. The collector of transistor 81 is connected to the base of transistor 79. A pair of serially connected resistors 83, 84 is connected across the voltage rails 76 and 77. The junction of these resistors is connected to the base of transistor 81. In addition, a positive feed back path including a capacitor 85 connects the collector of transistor 79 with the junction between the resistances 83 and 84.

Because of the positive feed back path, the above described circuit is essentially an oscillatory circuit in which in its quiescent state the transistor 81 is switched OFF and the transistor 79 is switched ON, by way of loop voltage derived via resistor 82.

The circuit is set into oscillation by producing an inbalance between the resistors 83 and 84 which causes the transistor 81 to switch ON: whereupon the transistor 79 is switched OFF. As a result of positive feed back through capacitor 85 the circuit is set into oscillation producing, for example, an audio frequency output across the diode 78. The average voltage in the rail and across the diode 78 remains substantially at the quiescent value, whilst the frequency of this voltage is principally set by the circuit values of the resistor 83 and the capacitor 85.

In this circuit the diode 78 serves to restrict the modulation from exceeding 0.8 volts in the event that a fault develops in the remainder of the circuit of FIG. 7.

This alternating voltage will be detected at the control circuit by the transmitter/receiver unit 64, is amplified by amplifier 67 and can be heard through speaker 68. Alternatively, as independently powered receiver unit can be plugged into the loop.

To use the above circuit as a sensor the above mentioned resistance inbalance between resistors 83, 84 can be produced by making either or both of these resistors 83, 84 responsive to an external condition to be monitored. That is the actual detectors rely upon a change of resistance value to provide an output. In other words the detector variable resistor is used as the resistor 83 or 84 according as to whether the detector response increases or decreases the value of the resistance.

The purpose of the additional contacts of the switch 61 will now be considered. As shown the switch has contacts 86, 87, 88, 89 and 90. Also the switch has a contact arm 91 which is connected to the lower voltage rail—that is the arm 91 is earthed.

As has been mentioned the contact arm of the switch 63 is ganged with the switch 61. Thus the contact arm of the switch is ganged with the arm 91, the ganging being such that when the arm 91 co-operates with contact 86, the switch 63 connects the astable circuit 62 to the circuit point 5 and disconnects the source 12 from the circuit point 5, and that at all other settings of the arm 91 the switch 63 connects the source 12 to the point 5 and disconnects the astable circuit 62.

The switch contact 86 is connected to circuit point 60 so that relay operation and timer circuit operation are inhibited during that part of the checking operation during which the switch arm 91 co-operates with the contact 86.

The switch contact 87 is connected to the junction between the timer unit 23 and the base of transistor 15. In addition, a push button switch 92 is connected between the circuit point 5 and the switch 63 so that depression of the push button switch 92 allows the timer unit 23 to be energised for a time period equating to the time constant of the capacitor 19 and resistances 17, 18. A diode 92A is connected across the switch 92.

The switch contact 88 is connected by way of serially connected LED 93 and zener diode 94 to the positive end of the battery 28.

The switch contact 89 is connected to the circuit point 60A. The switch contact 90 defines the normal or OFF position for the switch arm 91.

The switch 61 is employed as follows:

First position; in which switch arm 91 co-operates with contact 86. This is chosen to permit the above discussed loop switch condition checking operation.

Second position; in which switch arm 91 co-operates with contact 87.

Since the contact 87 is connected to earth by way of the switch arm 91 operation of the hold circuit for the relay is inhibited. If now the push button 92 is depressed the operation of the alarm is checked, the time constant of the capacitor 19 and resistors 17, 18 typically allowing the hammer of the alarm bell to fall once only.

Third position; in which the switch arm 91 co-operates with contact 88.

In this setting the positive side of the battery 28 is connected through the LED 93 and zener diode 94, and the switch 61 to the lower voltage rail 11. If the battery is providing an adequate potential the LED 93 is caused to illuminate. Thus the third switch position enables a battery checking facility.

Fourth position; in which the switch arm co-operates with contact 89. This is the setting used when it is desired to over-ride the alarm system as such but still leave the system responsive to output from those types of hazard and other sensors included in the loop 2 which are made capable of generating a voltage excursion approximating to the full rail voltage and will cause the alarm to be triggered by way of the voltage detector 20. This setting is a convenient facility for use when a building is in use, and the opening of doors and windows is to be a normal event. It will be noted that all of the hazard and personal attack switches are at all times operative.

Fifth position; in which the switch arm co-operates with contact 90. This is the setting which removes the inhibit connection from circuit point 60 to the voltage rail and this leaves the system conditioned for alarm response to operation of the intruder operated switches in the system, and also responsive to any other sensors included in the loop which are made capable of generating a voltage excursion of 1.5 volts.

Further embodiments of sensors and their associated circuitry will now be considered. Some transducers such as thermistors for instance, do not have a fast switching action and this has to be achieved electronically by Schmitt trigger action. A typical electronic switch of this variety is illustrated in FIG. 8. Once again LED 73 and diode 72 provide the power supply across rails 96 and 97. NTC thermistor 100 divides the voltage across the rails with resistor 99 which is adjusted so that Ge transistor 98 is non-conducting. This allows a resistor 102 to make Ge transistor 103 fully conducting pulling the rail voltage down to 0.3 v, thus LED 73 is extinguished. If thermistor 100 is now heated its resistance reduces and transistor 98 begins to conduct the base current supplied to transistor 103 by resistor 102. A threshold is reached where transistor 103 starts to switch off causing rail 96 to go more positive. This small positive excursion is transmitted to the base of transistor 98 by a capacitor 101, which conducts harder whereupon a regenerative action takes place resulting in transistor 103 switching off quickly, diverting the major part of its current back through LED 73 and diode 72. Thus the rail voltage rises to 2.3 v, LED 73 illuminates and the $(2.3-0.3)v=2$ volt trigger voltage results in a timed alarm. When the thermistor cools down sufficiently the circuit snaps back to its quiescent state, where transistor 103 is fully conducting, LED 73 is extinguished and the rail voltage 0.3 v. Note:

(1) The circuit will function without capacitor 101 but its inclusion gives a quicker switching action particularly if resistance 100 and 99 are high when switching takes place.

(2) A Si transistor can be substituted for Ge transistor 103 in which case the quiescent rail voltage is 0.7 v and the trigger signal is 1.6 volts $(2.3-0.7)$ volts.

(3) No meter is required for setting up the quiescent condition; merely reduce the resistance of 99 until LED 73 extinguishes. In practice where specific temperature thresholds are required the designer has a choice of various thermistors in conjunction with discrete values of resistance for resistor 99.

For some purposes of detection the resistance of certain sensors increases. For example using a thermistor to sense coldness or breaking the beam between a light and a photocell. It is possible to use the circuit in FIG. 8 and reverse the positions of 100 and 99 but is not so successful nor so tolerant as the circuit shown in FIG. 9. In this circuit an LDR photocell 104 is placed at the end of a short time 105 so as to exclude stray light, and is pointed at a light source such as a normal domestic light. The quiescent and triggered conditions are shown below the various active devices. Resistance 106 is reduced so that Ge transistor 107 is conducting sufficiently to switch off the Si transistor 108 allowing resistor 109 to bias the Si transistor 110 on, If the light beam is interrupted, LDR photocell resistance increases fairly quickly resulting in transistor 107 switching off, the transistor 108 switching on, the transistor 110 switching off and the major part of the current being diverted through the LED 73 and the diode 72, resulting in an initiation of the control circuit 7 to produce a timed alarm. Once again positive feedback takes place and is enhanced by capacitor 111 particularly at low quiescent light levels when the resistance of the LDR is high and the response sluggish. In FIG. 9 the voltage rails are indicated at 112 and 113.

The unique quality of these circuits besides their configuration, simple setting up, Schmitt trigger action, use they are put to and the convenience of being powered by the loop current, is the percentage of modulation caused by the output to its own power supply thus obviating the need and expense of an interfacing relay. Whilst substitute circuits, have been employed by the Applicants quite successfully, using transistor fabricated silicon controlled switches it has been found that careful choice of transistor types are necessary, otherwise circuit performance becomes suspect.

Also circuits employing operational amplifiers and CMOS integrated circuits have been used successfully but as the minimum working voltage then required is 3 v as compared with voltages of 0.3 and 0.7 v for transistors the loop voltage available cannot support the same number of electronic switches.

The sensors used to far have been resistive types used in dc coupled circuits. Detectors employing ac signals may also be used, transitioning from ac to dc within the circuitry. This includes audio detectors tuned to the sound of breaking glass and ultrasonic detectors. A loop powered ultrasonic detector is shown in FIG. 10 and will now be described.

An independently powered ultrasonic transmitter (not shown) is pointed at the receiver crystal 114 so as to cause an invisible beam of ultrasonic energy. The signal from the receiver is amplified first through the common emitter stage formed conventionally by Ge transistor 115, base resistor 116 and collector resistor 117. The amplified signal is passed by capacitor 118 to a second common emitter amplifier consisting of Ge transistor 119, base resistor 120 and collector resistor 121. The further amplified signal is passed by capacitor 122 to a third common emitter amplifier consisting of a Ge transistor 123, base resistors 124 and 125 and a collector resistor 126 acting in conjunction with a capacitor 127 to maintain the base of Si transistor 128 at virtually zero volts and therefore non-conducting. This allows base resistor 129 to maintain the Si transistor 130 fully conducting, the rail voltage 131–132 at approximately 0.7–0.8 v and the LED 133 extinguished. If the ultrasonic beam is interrupted by a solid object such as an intruder, or the transmitter or receiver are moved out of alignment, insufficient received signal at the receiver 114 results in capacitor 127 charging up and making transistor 128 conduct; the transistor 130 switches off diverting much of its current through the LED 130 and the diode 134 resulting in a timed alarm being produced. One of the problems associated with many of the free standing self contained battery alarm detectors presently available is that whilst manufacturers have brought the quiescent currents down to ultra-low values, 10–1000A being typical, the alarm consumes a relatively high current which can soon exhaust the small batteries employed. In practice the manufacturer has no control over the number of times the alarm is triggered once it is in the hands of the customer, hence battery life can be short-lived. Meanwhile the loop system as so far described, henceforth called the Power Modulated Loop Alarm System (PMLAS) has a problem when it comes to powering detectors which need a high voltage (e.g. 9 v for an ionization type smoke alarm) since this would detract from the total number of detectors which can be powered from the loop. The smoke alarm could be powered from an independent battery and connected into the loop via relay contacts but relay currents are normally measured in milli-amps and these too could shorten the life of the battery. FIG. 11 illustrates an economical solution requiring much less hardware than the self contained unit. One of the terminals of the independent battery 135, in this case the negative terminal, is connected to the loop. The battery powers the first stage only of the smoke alarm 136 the output of which is fed to a loop powered amplifier/Schmitt trigger 137 similar to one of those contained in FIG. 8 or 9. The trigger 137 is connected across LED 138 and diode 139 provided in the loop 2. Thus the battery 135 never has to provide more than a few micro-amps and its life can be guaranteed, 137 provides the interfacing and is powered by the loop and a more strident alarm than that provided by a self cntained unit is powered from the high current supply 28 (FIGS. 1 and 4) of the PMLAS. Henceforth this configuration of feeding an independently powered sensor to a loop powered amplifier will be called "the donor system".

Mention will also be made of the fact that the donor system can be worked in reverse since a healthy trigger signal is available from across the loop LED and diode. Thus for instance the circuit of FIG. 9 plus an independently powered solenoid circuit and small camera could be placed in a container such that when the intruder interrupts the beam not only does the alarm sound but the trigger signal, tapped from across the LED and diode, triggers the solenoid circuit which in turn trips the camera. Alternatively, where isolation is necessary, the trigger signal can be extracted by sensing the light from the LED 73.

It can be deduced that the number of times the alarm can be re-triggered is limited by the total voltage across the loop less the incremental reduction of 1.5 v dc at point 5 (FIGS. 1,4) each time a switch is opened plus allowances for the initial voltage at point 5 due to loop current flowing through the inherent resistance of the loop wire plus 0.3 v or 0.7 v for the quiescent voltage of each transistor switch depending on whether Ge or Si, plus typically 1.5 v for the minimum working voltage across the constant current source 12. Thus employing a 16 v power supply, less say 7 volts standing voltage for the above mentioned allowances leaves 9 v available for incremental reduction thus allowing 6 open switches before exhausting the available power supply. On the one hand it may be reasonably argued that the owner would have to be very unlucky to have six burglaries whilst absent from the premises and on the other that it would be desirable to increase the trigger signal to provide a higher interference threshold. Thus one can be traded-off for the other by shunting extra LED's diodes and/or resistance across the switches to increase the trigger signal and accept the lower number of alarm resets. Another alternative is to increase the loop voltage to the maximum allowed by law i.e. feed the constant current generator from a higher voltage source. For economical reasons in order to retain the one value battery supply 28 (FIGS. 1 and 4) the higher voltage can be obtained from a battery powered voltage converter (In practice the power supply for the system is derived from the mains with a back-up battery in case of mains failure hence the use of the converter is still valid). Yet another alternative is to use more than one loop but this defeats the advantage of keeping the wiring simple and reducing installation problems.

If switch 42 (FIG. 4) is rotated to position 49 the loop is closed through resistance 66 and transformer 65. This means that any ac signal generated in this continuous loop is available at any point in the loop and can therefore be used for communication purposes. Conventional systems cannot employ this technique since an open switch breaks the circuit and typically during the day time doors or windows may be left open. Even with PMLAS there is the problem of the one-way LED's and diodes but fortunately so long as the constant current generator feeds its dc current to the loop (a small proportion bleeds off through 66 and 65) any exposed diode is biased into its linear region and becomes merely a low resistance to small ac voltages, typically less than 20n. The same reasoning applies to the output transistors of the electronic switches or their associated diodes. Yet another reason for keeping audio signals in the loop at a low level is to avoid excursions into the alarm trigger voltage range. Transformer coupled microphones and self contained independently powered receivers or transmitter-receivers can be plugged into the loop at any point allowing a very economical and versatile intercom system. Transformer coupling into the loop is recommended for high signal transfer, isolation of the microphone and/or loudspeaker from the dc current in the loop and the low resistance afforded by the secondary winding gives a lower dc voltage drop thus conserving loop voltage. Referring back to FIG. 4 it will be seen that such a transformer coupled receiver 68, 67 and 65 (it could be a transmitter receiver if so desired) has been placed in the control unit 7 and is powered conveniently direct from the power supply 28. It will receive and amplify any audio signal in the loop and the sound will be emitted from loudspeaker 68. It will be recalled that FIG. 7 discloses a first form of a tone generator, represented by 38 (FIG. 4) which can be substituted where necessary for the electronic switches.

It is convenient to recap upon the FIG. 7 embodiment. If resistor 83 is too high or resistor 84 is too low the Ge transistor 81 is non-conducting and resistor 82 biases the Ge transistor 79 on, resulting in a rail voltage potential 77–76 across Si diode 78 of 0.3 v. If resistor 83 is reduced sufficiently or resistor 84 increased sufficiently (either resistor can be a resistive type detector e.g. thermistor LDR in which case te other is made adjustable) transistor 81 switches on and oscillation of the rail voltage takes place due to positive feedback through capacitor 85. The average dc voltage of the rail still remains at 0.3 v and the frequency is principally dictated by the value of resistor 83 and capacitor 85. The tone produced is amplified by amplifier 67 and can be heard through speaker 68 in the control unit 7 or any independently powered receiver amplifier plugged into the loop. The Si diode 78 is included both to avoid the voltage rail 77–76 exceeding 0.8 v should there be a malfunctioning of the transistorised circuit and also to limit the depth of square wave modulation.

As the alarm is not triggered due to the low voltage excursion this type of detector can be usefully employed for a host of non-hazardous warnings e.g.

freezer temperature, greenhouse temperature, sensing water leaks, soil humidity detector for house plants, child with a bad wetting problem, overboiling fluid, rain detector, steam detector and door chimes to name some. These detectors can be plugged into the loop at any time and being powered by the loop and using the control box amplifier/speaker are economical in hardware and cost. In the case of the door chimes the resistor 84 is deleted and several resistors are substituted for resistor 83 (one per note) which are connected in sequence, by a spring loaded rotatable switch, to rail 77. When rotated by the caller a short tune is emitted from speaker 68 and when the knob is released it returns to its quiescent position such that rails 77 and 76 are shorted together thus conserving loop voltage. A second door chime plays a different tune for identification of front-/rear door. The second tone generator to be described is illustrated in FIG. 12 and may be recognised as the addition of a transistorised astable circuitry, contained within the dashed lines 141–142, to the circuit illustrated in FIG. 8. Referring to both FIGS. 8 and 12 in the quiescent condition with the rail voltage 77–78 at 0.3 v Ge (or 0.7 vSi) the conventional astable circuit formed around transistors 143 and 144 cannot oscillate due to insufficient working voltage allowed by the inclusion of diode 145 in the emitter circuits. When the circuit of FIG. 8 is triggered the rail voltage switches rapidly to 2.3 v and not only is the alarm bell 27 triggered, but the astable commences to oscillate causing the voltage rails 96–97 to be modulated in sympathy, producing a square wave tone which is emitted from speaker 68 in the control unit 7. Thus a warning is given at all times either by a distinctive tone emitted from the speaker, or a distinctive tone and triggering of the alarm bell.

By suitable choice of astable components it can be arranged for the voltage excursion on triggering to be less than the alarm triggering voltage in which case only the distinctive tone is emitted from the speaker at all times. This configuration would then be a subsitute for that in FIG. 7. Also changes in the mark space ratio and asymmetrical depth of modulation can be achieved.

If the diode 72 is substituted with an appropriate value resistance, or both diodes 71 and 72 are deleted if visual indication is not required, should the circuit now be triggered the rail voltage 96–97 excursion would take it above that of the voltage detector 20 threshold. Such a circuit would be useful for a hazard warning such as a fire alarm since both the alarm 27 will be triggered *and* a distinctive tone will be emitted *at all times* immediately alerting anyone to the nature of the alarm. If the fire is successfully dealt with the circuit will automatically reset when the thermistor cools down, the voltage rail returning to 0.3 v or 0.7 v quiescent voltage (dependent on Ge or Si output transistor) otherwise in spite of a timed alarm bell, such timing being a requirement by law in many States, although it may cease after the appropriate time the distinctive tone will continue to be emitted from loudspeaker 68.

Note that for illustration purposes the astable in FIG. 12 has been used in conjunction with the transistorised switch of FIG. 8. It could also be used in conjunction with any of the transistor switches described, or in conjunction with a mechanical switch such as a fire wire, or thermostat of the bi-metal strip variety, both conventionally employed as fire detectors. If used with such a switch the off-setting voltage diode 147 will not be required since a mechanical switch, when closed, will short the rails 96–97, completely preventing any possibility of spurious oscillation, which might otherwise occur with the quiescent voltage of 0.3 v or 0.7 v present in the transistorised switch, if it were not for the diode 147.

The following table provides an indication of various types of warning possible. (Contents of table are typical and not intended to be exhaustive).

| SWITCH 66 | ALARM PLUS DISTINCTIVE TONE | ALARM ONLY | SINGLE DISTINCTIVE TONE ONLY | MULTI-TONE ONLY |
|---|---|---|---|---|
| Standby | Hazard[(1)] | P.A. switch. loop open circuit. excessive cheat resistance. | Semi-hazard[(2)] Non-hazard | Door chimes voice communication. baby sitting alarm. Telephone repeater. Piped music. |
| ALARM | Hazard[(1)] Plus Semi-Hazard[(2)] | P.A. switch loop open circuit. excessive cheat resistance. Plus Intruder | Semi-hazard[(2)] Non-hazard | Door chimes voice communication. baby sitting alarm. Telephone repeater. Piped music. |

(1)Example of hazard would be fire and smoke.
(2)Semi-hazard during the day could become a hazard at night e.g. areas of flooding.
NOTE:
What may be a non-hazard to some may be a hazard to others and the circuits in FIGS. 7 and 12 can be used accordingly.

If subsidiary buildings such as the garage or garden shed are required to be protected a method of doing so is shown in FIG. 13. In FIG. 13 a loop of wire 148, across a LED placed in the loop 2 at a convenient pick-off point situated in the main premises, can be taken off to the buildings concerned and several switches, represented by switches 149 and 150 placed in series. If any of these switches are opened a 1.5 v trigger voltage is generated in the loop circuit 2 and a timed alarm results. The advantage of this arrangement is that even if the intruder found some way of opening one of these switches without the alarm sounding the security of the main premises is not prejudiced since only 1.5 v across LED 151 is lost in the main loop circuit 2. Similarly this principle allows the owner to have as many 'lines of defence' as is required extending outside the main premises. Typically these audilliary loops can include light trip wires, fusible plugs, fire wires or indeed any switch arrangement limited only the imagination of the owner.

Whilst the above discussed system has shown normally closed (NC) switches throughout normally open (NO) switches could be used instead but this would have the grave disadvantage of reducing the number of switches which can be used owing to the quiescent standing voltage across the associated resistive element. Also whilst the embodiment takes advantage of the single NC loop wire to simplify and economise on wiring installation it could take a parallel or series-parallel circuit form of loop arrangements.

On the grounds of economy and simplifity the system discussed has taken the form of dividing the warnings according to amplitude and distinctive aural frequency. A more elaborate system could take advantage of placing a different frequency oscillator across every switch in the loop using these distinctive square wave tones generated at source (above aural threshold if necessary) transmitting them along the loop to a computer in the control box for processing according to time, to establish they are significant tones and not spurious interferences, then decoding according to frequency and/or average voltage, then passed through a logic unit for display perhaps consisting of an alarm and a VDU together with a loud repeating voice recorded message indicating the nature of the hazard and its location.

It will also be understood that the system may be applied to 'paging' arrangements, for example, in hospitals, factories or the like, by imposing on the system selective frequencies, which are raised at source.

I claim:

1. An event detection and indication system, comprising a loop circuit incorporating a series of event-responsive switches, each such switch having associated therewith means for maintaining electrical continuity within the loop circuit whenever its associated switch is operated to interrupt the loop circuit, the means producing an electrical signal pulse of predetermined characteristic in the loop circuit upon operation of an associated event-responsive switch, remote indication means for indicating a switch has been operated, and a control means for controlling operation of the indication means operationally interposed between the loop circuit and the indication means and exclusively responsive to the operation of an event-responsive switch to produce a control signal which initiates a predetermined operational cycle of the indication means, the indication means responding to such a control signal by completing the predetermined operational cycle irrespective of the restoration of the event-responsive switch which gave rise to the signal to its initial non-operated condition, the control means remaining responsive after completion of the predetermined operational cycle of the indication means to subsequent operation of any other event-responsive switch even though any previously operated event-responsive switch is in its operated condition.

2. An event-detection and indication system as claimed in claim 1 wherein each of said means for maintaining electrical continuity within the loop circuit exhibits substantially the same impedance value, whereby the pulse produced in the loop circuit upon switch operation is substantially uniform irrespective of which of the event-responsive switches is operated.

3. An event-detection and indication system as claimed in claim 1 wherein said means for maintaining the electrical continuity includes means providing visual indication that the associated event-responsive switch has been operated.

4. An event-detection and indication system as claimed in claim 1 wherein a first group of said event-responsive switches comprises passive switching elements and wherein a second group of said event-reponsive switches further comprises sensor means responsive to predetermined situations for causing operation of the associated switches.

5. An event-detection and indication system as claimed in claim 4 wherein at least one of said sensor means produces a characteristic output signal, which signal is introduced into the loop circuit, and wherein said control means further comprises means for identifying any such characteristic output signal and producing a characteristic indication of the identification of such characteristic output signal.

6. An event-detection and indication system as claimed in claim 5 wherein said characteristic output signal comprises a preselected frequency signal characteristic of the fact that the associated sensing means has reacted to the situation to which it is intended to be responsive, and wherein the control means further comprises means for detecting any such preselected frequency signal and for producing a corresponding alarm indication.

7. An event detection and indication system as claimed in claim 1 wherein the control means further comprises means for detecting the number of event-responsive switches that are in their operated condition.

8. An event detection and indication system as claimed in claim 1 wherein said event-responsive switches further comprise power supplies for the operation thereof which derive power for their operation from current flow within the loop circuit, each power supply being arranged to produce a predetermined electrical condition in the loop circuit upon operation of the associated event-responsive switch, and wherein said control means further comprises means for responding to said electrical condition in the loop circuit.

9. An event detection and indication system as claimed in claim 1, further comprising transmitter and receiver arrangements connected in the loop circuit so that the loop circuit is used as part of a communication facility which is operable independently of the event-responsive switch operation, and wherein said means for maintaining electrical continuity within the loop circuit do not unnecessarily impede operation of the communication facility in the event of operation of an event-responsive switch.

10. An event detection and indication system as claimed in claim 1 wherein each said means for maintaining the electrical continuity of the loop circuit comprises a unidirectional conductive device having an electrical response curve such that the AC impedance levels of the loop circuit do not prevent transmission of radio or audio frequency signals.

11. An event detection and indication system comprising a loop circuit incorporating a series of event-responsive switches, each such switch having associated therewith means for maintaining electrical continuity within the loop circuit whenever its associated switch is operated to interrupt the loop circuit, remote indication means for indicating a switch has been operated, and a control means, operationally interposed between the loop circuit and the indication means and responsive to the operation of any event-responsive switch, for controlling operation of the indication means, the control means remaining unresponsive to a subsequent operation of any event-responsive switch during a predetermined operational cycle period following operation of a first event-responsive switch, the control means being thereafter responsive to any subsequent operation of any other event-responsive switch, even though any previously operated event-responsive switch is in its operated condition.

12. An event detection and indication system as claimed in claim 11 wherein the means for maintaining electrical continuity within the loop circuit exhibits a non-zero impedance.

13. An event detection and indication system as claimed in claim 11 wherein the indication means comprises an alarm which is activated by the control means only during said predetermined operational cycle.

14. An event detection and indication system as claimed in claim 11, further comprising isolation means situated between the control means and the loop circuit for isolating the control means from any DC potential which might exist across the loop circuit, whereby a steady state voltage condition in the loop circuit will not produce operation of the indication means.

15. An event detection and indication system, comprising a loop circuit incorporating a series of event-responsive switches, each switch having uniquely associated therewith means having non-zero impedance for maintaining electrical continuity within the loop circuit in the event the associated switch is open, a control means, including a timing means, the control means being responsive to a predetermined change of voltage across the ends of the loop circuit, for actuating an indicator means and a holding means, the indicator means connected to an output of the control means indicating the opening of one of the event-responsive switches, the holding means holding the indicator means once actuated in an indicating condition irrespective of the opening or closing of any of the event-responsive switches, and the timing means timing the operation of the indicator means from its actuation by the control means and, after a preselected period of time, interrupting the holding means, thereby terminating the indicating condition of the indicating means irrespective of the opened or closed condition of any of the event-responsive switches whereby the system is automatically reset to detect and indicate any subsequent opening of one of the event-responsive switches.

* * * * *